United States Patent Office.

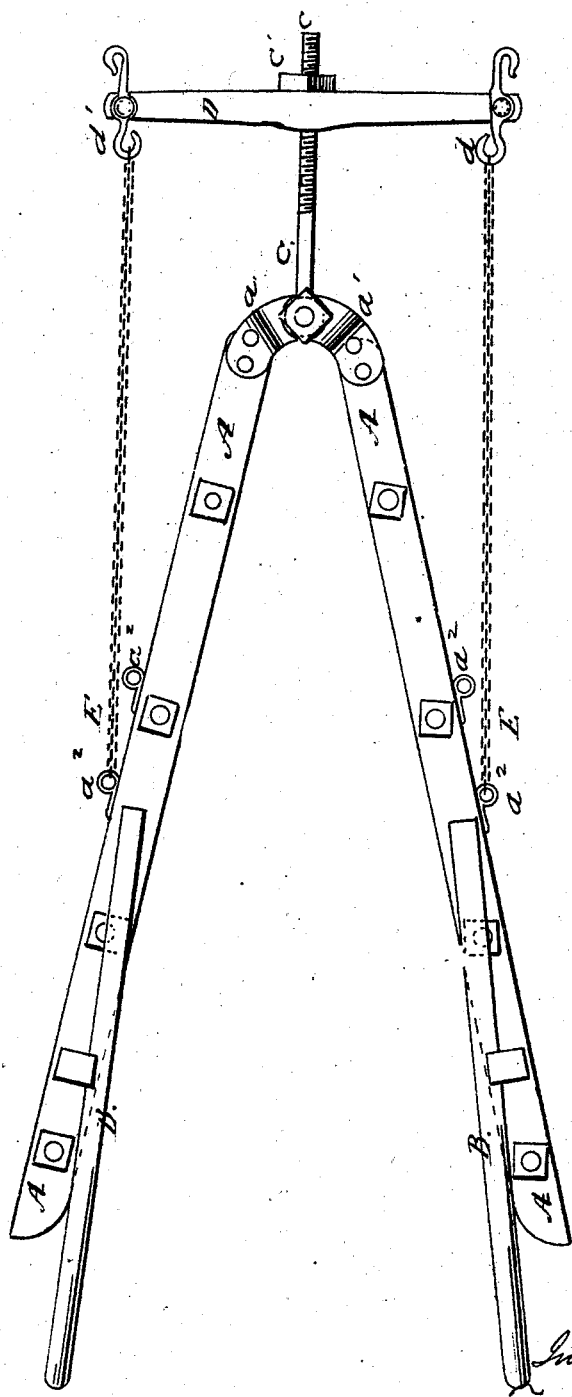

THOMAS GREEN AND JACOB SOMMER, OF METAMORA, ILLINOIS.

Letters Patent No. 74,844, dated February 11, 1868.

IMPROVEMENT IN CULTIVATORS.

The Schedule referred to in these Letters Patent and making part of the same.

TO ALL WHOM IT MAY CONCERN:

Be it known that we, T. GREEN and J. SOMMER, of Metamora, in the county of Woodford, and State of Illinois, have invented a new and useful Improvement in Cultivators; and we do hereby declare that the following is a full, clear, and exact description thereof, which will enable others skilled in the art to make and use the same, reference being had to the accompanying drawing, forming part of this specification.

The figure is a top or plan view of our cultivator.

Our invention has for its object to furnish an improved cultivator, simple in construction, durable, easily adjusted to cultivate rows at any distance apart, and which may be used with great advantage for putting in wheat and other grain; and it consists in the combination of the adjustable pivoted draught-rod and draught-chains with the single-tree and with the plough-beams pivoted to each other at their forward ends; the whole being constructed and arranged as hereinafter more fully described.

A are the beams, which may be of any desired length, and may have any desired number of ploughs attached to them. The forward ends of the beams A meet and are pivoted to each other by the shank or standard of the forward plough, which passes up through holes formed in the ends of straps $a^1$, attached to the ends of the said beams A. B are handles attached to the rear parts of the beams A, by means of which the cultivator may be guided between the rows, or raised to pass over obstructions. C is a rod, the rear end of which is pivoted to the forward ends of the beams A, by having a hole or eye formed in it through which passes the standard of the forward plough, by which standard the ends of the said beams are pivoted to each other. The forward part of the rod C passes through the centre of the single-tree D, and has a screw-thread cut upon it for the reception of the screw-nut $c'$, by which the position of the said single-tree is adjusted as required. E are chains, the forward ends of which are attached to the ends of the single-tree D, by hooks $d'$, or equivalent device. The rear ends of the chains E are hooked upon hooks $a^2$, one or more pairs of which are attached to the outer sides of the beams A, as shown in the drawing.

By this construction, by changing the points of attachment of the chains E to the beams A, by varying the length of the chains or the position of the nut $c'$ upon the rod C, the beams A may be adjusted to work further apart or nearer together, according to the width of the rows or the particular character of the work being done.

Having described our invention, we claim as new, and desire to secure by Letters Patent—

The combination of the adjustable pivoted draught-rod C, and adjustable draught-chains E, with the single-tree D, and with the plough-beams A, pivoted to each other at their forward ends, substantially as herein shown and described, and for the purpose set forth.

THOMAS GREEN,
JACOB SOMMER.

Witnesses:
JAS. M. JOHN,
GILBERT EGBERT.